United States Patent
Hao et al.

(10) Patent No.: US 10,121,128 B2
(45) Date of Patent: *Nov. 6, 2018

(54) AUTOMATED FINANCIAL TRANSACTIONS

(71) Applicant: International Business Machines Corporation, Armonk, NY (US)

(72) Inventors: Biao Hao, Grapevine, TX (US); Denzil S. Menezes, Irving, TX (US); Wade A. Miller, Southlake, TX (US); Raymond L. Yee, Pompano Beach, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/626,970

(22) Filed: Jun. 19, 2017

(65) Prior Publication Data

US 2017/0286930 A1    Oct. 5, 2017

Related U.S. Application Data

(63) Continuation of application No. 14/491,632, filed on Sep. 19, 2014, now Pat. No. 9,697,505.

(51) Int. Cl.
| | |
|---|---|
| *G06Q 40/00* | (2012.01) |
| *G06Q 20/10* | (2012.01) |
| *G07F 19/00* | (2006.01) |
| *G06Q 20/32* | (2012.01) |
| *G06Q 20/40* | (2012.01) |

(52) U.S. Cl.
CPC ..... *G06Q 20/1085* (2013.01); *G06Q 20/3223* (2013.01); *G06Q 20/3224* (2013.01); *G06Q 20/3278* (2013.01); *G06Q 20/4097* (2013.01); *G07F 19/206* (2013.01)

(58) Field of Classification Search
CPC .... G07F 19/20; G07F 19/201; G06Q 20/1085
USPC ........................................................ 235/379
See application file for complete search history.

(56) References Cited

U.S. PATENT DOCUMENTS

| | | |
|---|---|---|
| 8,632,000 B2 | 1/2014 | Laracey |
| 9,697,505 B2 | 7/2017 | Hao et al. |
| 2002/0100660 A1 | 8/2002 | Stieber et al. |
| 2011/0251892 A1 | 10/2011 | Laracey |

(Continued)

FOREIGN PATENT DOCUMENTS

WO    0186556 A1    11/2001

OTHER PUBLICATIONS

IBM: List of IBM Patents or Patent Applications Treated as Related, 2 pg.

(Continued)

*Primary Examiner* — Ahshik Kim
(74) *Attorney, Agent, or Firm* — Cuenot, Forsythe & Kim, LLC

(57) ABSTRACT

Arrangements relate to processing financial transactions on an automated teller machine (ATM). An ATM identifier can be presented on a display of the ATM. An ATM identifier confirmation can be received from a mobile computing device. Responsive to determining that the ATM identifier confirmation matches the identifier presented on the display of the ATM, a customer authentication or a transaction request can be received from the mobile computing device. Responsive to verifying the customer authentication or the transaction request, the transaction request can be processed.

20 Claims, 8 Drawing Sheets

(56) References Cited

U.S. PATENT DOCUMENTS

| | | |
|---|---|---|
| 2012/0160912 A1 | 6/2012 | Laracey |
| 2013/0006849 A1 | 1/2013 | Morris |
| 2013/0097083 A1 | 4/2013 | Fisher |
| 2014/0006190 A1 | 1/2014 | Loomis, III et al. |
| 2014/0074714 A1 | 3/2014 | Melone et al. |
| 2014/0279490 A1 | 9/2014 | Calman et al. |
| 2015/0120878 A1 | 4/2015 | Horgan et al. |
| 2015/0121488 A1 | 4/2015 | Vaughn et al. |
| 2015/0127714 A1 | 5/2015 | Ivashyn |
| 2016/0086143 A1 | 3/2016 | Hao et al. |

OTHER PUBLICATIONS

Hao et al., "Automated Financial Transactions", U.S. Appl. No. 14/491,672, filed Sep. 19, 2014, 35 pages.
Pous, M. et al., "Enhancing accessibility: Mobile to ATM case study," In 2nd IEEE Int'l. Workshop on Consumer eHealth Platforms, Services and Applications (CCNC), pp. 404-408, IEEE 2012.
Arabo, A., "Secure cash withdrawal through mobile phone/device," In IEEE Int'l. Conf. on Computer and Communication Engineering (ICCCE 2008), pp. 818-822, IEEE 2008.
Pereira, D., "Integration of IBM Worklight and Nuance Voice Services for Mobile Banking," [online] IBM Ecosystem Development Blog, Apr. 13, 2014 [retrieved Sep. 16, 2014] retrieved from the Internet: <https://www.ibm.com/developerworks/community/blogs/industry-solution-partners/entry/integration_of_ibm_worklight_and_nuance_voice_services_for_mobile_banking?lang=en>, 2 pg.

200

Responsive to receiving an indication that a mobile computing device is located within a predetermined distance from the ATM and determining the ATM is available for use, presenting an ATM identifier on a display of the ATM
205

Receiving an ATM identifier confirmation from the mobile computing device
210

Responsive to determining that the ATM identifier confirmation matches the ATM identifier presented on the display of the ATM, receiving a customer authentication or a transaction request from the mobile computing device
215

Responsive to verifying the customer authentication or the transaction request, processing the transaction request
220

Detect signals, via a mobile computing device, from one or more transceivers associated with an ATM
305

Based on the detected signals, determining the location of and/or the distance to the ATM relative to the mobile computing device
310

Presenting location information of the ATM relative to the mobile computing device
315

Responsive to a determination that the mobile computing device is located within a predefined distance from the ATM and a determination that the ATM is currently available for use, presenting a user interface on the mobile computing device for receiving an ATM identifier confirmation
320

Responsive to the ATM identifier confirmation matching an ATM identifier displayed on the ATM, sending a customer authentication and/or a transaction request to the ATM
325

FIG. 3

AUTOMATED FINANCIAL TRANSACTIONS

BACKGROUND

Arrangements described herein relate to interactions between financial entities and their customers.

Automated. Teller Machines (commonly referred to as ATMs) are devices that enable customers of financial entities to perform transactions related to their financial accounts without the need for a human cashier, clerk or bank teller. Examples of transactions that can be conducted using ATMs include withdrawals, deposits, transfer of funds between accounts, and account balance inquiries. To use an ATM, a customer swipes or scans a card at the ATM. Once sufficient authentication is provided, such as a personal identification number (PIN), a customer can input transaction details.

SUMMARY

According to an embodiment of the present invention, arrangements are directed to a method of processing a financial transaction on an automated teller machine (ATM). The method can include presenting an ATM identifier on a display of an ATM. The method can also include receiving an ATM identifier confirmation from the mobile computing device. The method can further include, responsive to determining, via a processor, that the ATM identifier confirmation matches the identifier presented on the display of the ATM, receiving a customer authentication or a transaction request from the mobile computing device. The method can include, responsive to verifying the customer authentication or the transaction request, processing the transaction request.

A system for processing a financial transaction on an automated teller machine (ATM) includes a processor programmed to initiate executable operations. The executable operations include presenting an ATM identifier on a display of the ATM. The executable operations also include receiving an ATM identifier confirmation from the mobile computing device. The executable operations further include, responsive to determining that the ATM identifier confirmation matches the identifier presented on the display of the ATM, receiving a customer authentication or a transaction request from the mobile computing device. The executable operations include, responsive to verifying the customer authentication or the transaction request, processing the transaction request.

A computer program product for processing a financial transaction on an automated teller machine (ATM) includes a computer readable storage medium having program code embodied therewith. The program code is executable by a processor to perform a method. The method can include presenting an ATM identifier on a display of the ATM. The method can further include receiving an ATM identifier confirmation from the mobile computing device. The method can include, responsive to determining that the ATM identifier confirmation matches the identifier presented on the display of the ATM, receiving a customer authentication or a transaction request from the mobile computing device. The method can further include, responsive to verifying the customer authentication or the transaction request, processing the transaction request.

BRIEF DESCRIPTION OF THE DRAWINGS

FIG. 2 is a flow chart illustrating a method of automated financial transactions in accordance with one embodiment disclosed within this specification.

FIG. 3 is a flow chart illustrating a method of automated financial transactions in accordance with one embodiment disclosed within this specification.

DETAILED DESCRIPTION

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to automated financial transactions. Arrangements described herein can facilitate the conducting of financial transactions on automated teller machines (ATM) using a mobile computing device.

Figure 1:
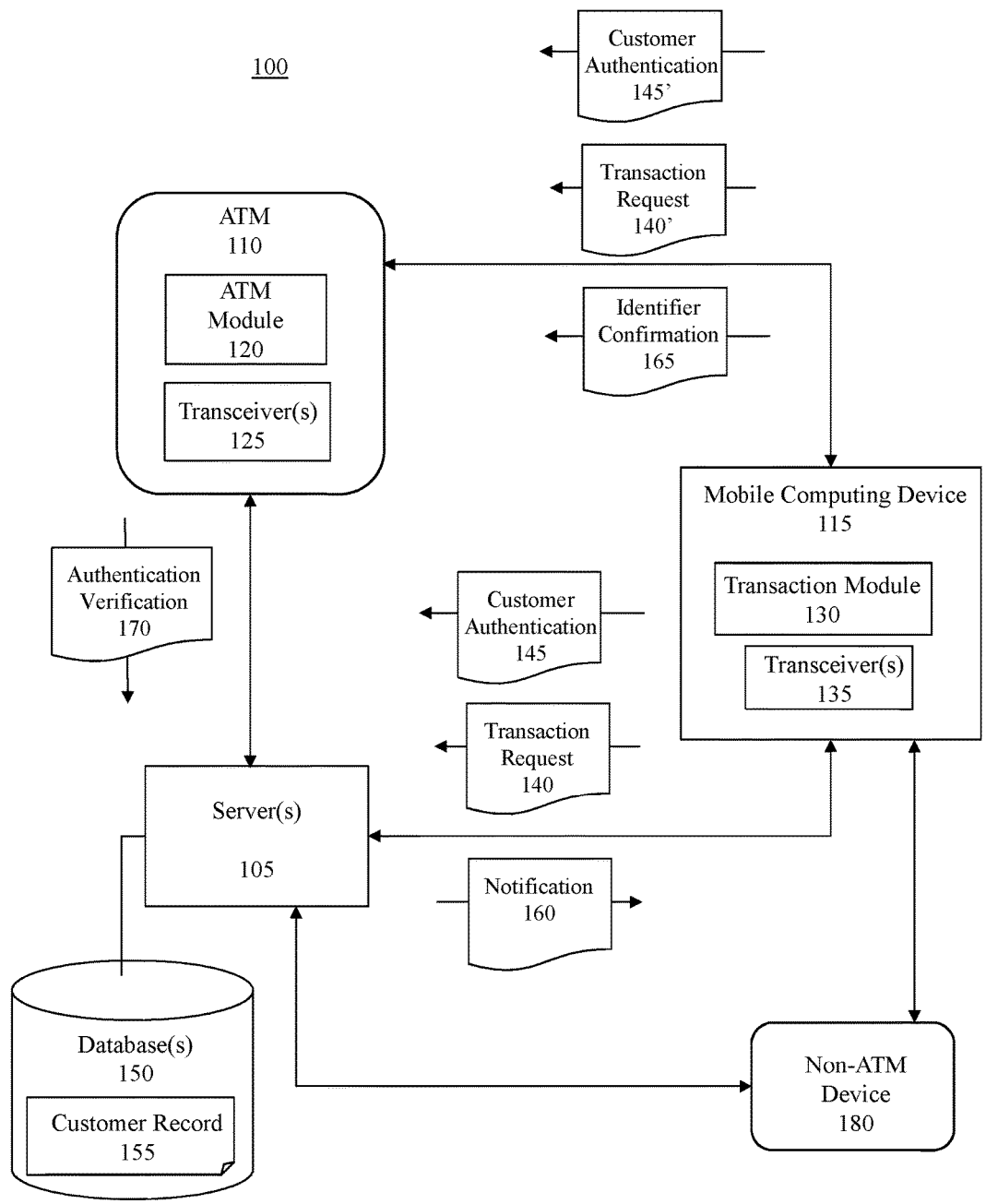
FIG. 1 is a block diagram illustrating a system for automated financial transactions in accordance with one embodiment disclosed within this specification.

FIG. 1 is a block diagram illustrating a system for automated financial transactions in accordance with one embodiment disclosed within this specification. The system 100 can include one or more servers 105, one or more automated teller machines (ATMs) 110 and one or more mobile computing devices 115. The server(s) 105, the ATM(s) 110 and/or the mobile computing device(s) 115 can include suitable operational software for performing the various functions described herein.

The mobile computing device 115 can be communicatively linked to the ATM 110 and to the server 105 through one or more communication networks. Likewise, the ATM 110 can be communicatively linked to the server 105 through one or more communication networks. In one or more arrangements, the communication network which the mobile computing device is communicatively linked to the ATM 110 and/or to the server 105 can be different from the communication network which the ATM 110 is communicatively linked to the server 105.

As used herein, the term "communicatively linked" can include direct or indirect connections through a communication channel or pathway or another component or system. A "communication network" means one or more components designed to transmit and/or receive information from one source to another. The communication network is the medium used to provide communications links between various devices and data processing systems connected together within network data processing system (or computing environment). The communication network may include connections, such as wire, wireless communication links, or fiber optic cables. The communication network can be implemented as, or include, any of a variety of different communication technologies such as a WAN, a LAN, Bluetooth low energy, a wireless network, a mobile network, a Virtual Private Network (VPN), the Internet, the Public Switched Telephone Network (PSTN), or the like.

The one or more servers 105 can be implemented as a financial server or a banking server, or other communication hub or server capable of performing the various functions described herein. The server 105 can include suitable operational software for performing the various functions described herein.

As used herein, the term "ATM" or "automated teller machine" means any device that provides a user interface that can enable a user to conduct financial transactions with a financial entity. The ATM 110 can be provided in any suitable form. For instance, the ATM 110 can be a standalone device (e.g. a kiosk) or it can be included as part of another structure (e.g. a building). The ATM 110 can be located remotely from the financial entity associated with the financial transactions being conducted on the ATM 110. The ATM 110 can be configured, arranged, and/or located to enable a user to approach the ATM 110 by foot or in a motorized vehicle or in any other suitable manner.

The ATM 110 can include a module 120 and a database. The ATM can include one or more of the elements presented in FIG. 8. The ATM module 120 and/or the database can be components of the ATM, or the module 120 and/or the database can be executed on and/or distributed among other processing systems to which the ATM is communicatively linked.

The ATM 110 can include one or more transceivers 125. A "transceiver" is defined as a component or a group of components that transmit signals, receive signals or transmit and receive signals, whether wirelessly or through a hard-wired connection. The one or more transceivers 125 can be located near, on and/or in the ATM 110. In one or more arrangements, at least one of the transceivers 125 can be a signal beacon.

The transceiver 125 can be operatively connected to a processor and/or memory elements of the ATM 110. Any suitable transceiver can be used to access a network, access point, node or other electrical device for the transmission and receipt of data. The transceiver 125 may be a wireless transceiver using any one of a number of wireless technologies. Examples of suitable transceivers include a cellular transceiver, broadband Internet transceiver, local area network (LAN) transceiver, wide area network (WAN) transceiver, wireless local area network (WLAN) transceiver, personal area network (PAN) transceiver, body area network (BAN) transceiver, WiFi transceiver, WiMax transceiver, Bluetooth low energy transceiver, Bluetooth transceiver, 3G transceiver, 4G transceiver, ZigBee transceiver, WirelessHART transceiver, MiWi transceiver, MiFi transceiver, IEEE 802.11 transceiver, IEEE 802.15.4 transceiver, or a Near Field Communication (NFC) transceiver, just to name a few possibilities. The transceiver 125 can include any wireless technology developed in the future. Again, the transceiver 125 can include one or more transceivers and can be any suitable combination of transceivers, including any combination of the transceivers noted above.

As noted above, the system 100 can include a portable or mobile computing device 115. The mobile computing device 115 can be, e.g., a mobile telephone, a smart phone, a wireless-enabled personal digital assistant, a portable computer, e.g., laptop, tablet or the like. Each of these devices can include and/or execute suitable communication software, which enables the device to communicate with the server 105 and/or the ATM 110 through a suitable communication network. The mobile computing device 115 can include one or more of the elements presented in FIG. 8.

In one or more arrangements, the mobile computing device 115 can include a transaction module 130. The transaction module 130 can be stored on, accessed by and/or executed on a processor of the mobile computing device 115. The transaction module 130 can be implemented as computer readable program code that, when executed by a processor, implement the various processes described herein. As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

The mobile computing device 115 can further include one or more transceivers 135. The transceiver 135 can be operatively connected to a processor and/or memory elements of the mobile computing device 115. Any suitable transceiver can be used to access a network, access point, node or other electrical device for the transmission and receipt of data. The transceiver 135 may be a wireless transceiver using any one of a number of wireless technologies. The various example of suitable transceivers described above in connection with the ATM 110 are equally applicable to the transceiver 135 of the mobile computing device 115.

The mobile computing device 115 can be operatively connected to the server 105 to send transaction requests 140 and/or customer authentication 145 thereto. "Transaction request" is defined as an electronic communication from a computing device to another device, system or component that asks for an action to be taken with respect to a user account. As an example, the transaction request can be the exchange, distribution, withdrawal, deposit, movement and/or transfer of funds from a user's financial account. If the customer authentication 145 is accepted, the transaction request 140 can be received. The transaction request 140 can be marked with any suitable notation. For instance, the transaction request 140 can be marked by the server 105 as pending. The transaction request 140 can be stored in a suitable database 150. The database 150 can be stored on, accessed by and/or executed on the server 105. In some arrangements, the transaction request 140 can be associated with a customer record 155 included in the database 150.

The server 105 can be operable to send one or more notifications 160 to the mobile computing device 115. The notification 160 can include any suitable information. For instance, the notification 160 can include an indication that the transaction request 140 has been received and/or is pending. The notification 160 can identify one or more ATMs 110 that are equipped to process the transaction request 140 (e.g. one or more ATMs with sufficient available cash to complete a cash withdrawal). In some arrangements, the server 105 can reserve the cash for the transaction request 140 at a specific ATM 110, which can be selected by the user or the system. The mobile computing device 115 can process the notification 160. The mobile computing device 115 can present the notification 160 or at least a portion of the information contained in the notification 160 to a user. For instance, the mobile computing device 115 can inform a user to proceed to a specific ATM to complete the transaction request 140.

The mobile computing device 115 can also be operatively connected to the ATM 110. As will be described in greater detail below, the ATM 110 can be configured to present an ATM identifier on a display 111 (FIG. 6) thereof "Display" is defined as a component or a group of components that present information/data in visual form. Using the mobile computing device 115, a user can submit an ATM identifier confirmation 165 to on the ATM 110. If the ATM identifier confirmation 165 sent from the mobile computing device 115 matches the ATM identifier displayed on the ATM 110, the mobile computing device 115 can send the customer authentication 145' and/or the transaction request 140' to the ATM 110. In some arrangements, the customer authentication 145' and/or the transaction request 140' can be identical to the customer authentication 145 and/or the transaction request 140 sent to the server 105.

The ATM 110 can be operatively connected to the server 105. Responsive to receiving a transaction request 140, the ATM 110 can be operable to send an authentication verification 170 to the server 105.

In one or more arrangements, the system 100 can include one or more non-ATM devices 180. A non-ATM device is any device that is communicatively linked to the server 105 but is not enabled or equipped to fully process at least some transaction requests (e.g. cash withdrawals and/or other financial transaction requests). The non-ATM devices can allow a user's transaction requests that were input offline to be synched with the server 105. Such synching can also be performed at an ATM 110.

FIG. 2 is a flow chart illustrating a method 200 of conducting a financial transaction on an automated teller machine (ATM) in accordance with one embodiment disclosed within this specification. The ATM can be configured to receive an indication as to when a mobile computing device is located within a predetermined distance from the ATM. An "indication" includes directly or indirectly receiving a signal, directly or indirectly detecting, and/or directly or indirectly determining. For example, in some instances, the indication can be a signal received by the ATM from the mobile computing device when the mobile computing device is located within a predetermined distance from the ATM. For instance, the mobile computing device (e.g., the transaction module) can be configured to determine the distance between it and the ATM. When the mobile computing device determines that it is within the predetermined distance to the ATM, the mobile computing device can send a signal to the ATM. In other arrangements, the indication can be the detection or determination by the ATM of a mobile computing device located within a predetermined distance from the ATM.

The ATM can be configured to determine whether the ATM is currently being used by a user. If an indication is received that the mobile computing device is not located within the predetermined distance from the ATM and/or if the ATM is determined as being used by another user, the ATM identifier for the detected mobile computing device is not displayed on the ATM.

Responsive to receiving an indication that a mobile computing device is located within the predetermined distance from the ATM and a determination that the ATM is not being used by another user, an ATM identifier can be presented on a display of the ATM at step 205. An example of the display of an ATM identifier on the ATM is shown and described in connection with FIG. 6 below.

The predetermined distance can be any suitable distance. In one or more arrangements, the predetermined distance can be about 6 feet, about 5 feet or less, about 4 feet or less, about 2 feet or less, about 1 foot or less, about 6 inches or less, about 5 inches or less, about 4 inches or less, about 3 inches or less, about 2 inches or less, or about 1 inch or less. In one or more arrangements, predetermined distances can be about 330 feet or less, about 300 feet or less, about 250 feet or less, about 200 feet or less, about 150 feet or less, about 100 feet or less, about 50 feet or less, about 25 feet or less, or about 10 feet or less. In one or more arrangements, the predetermined distance can be defined by the specifications of the particular communication network being used.

At step 210, an ATM identifier confirmation can be received from the mobile computing device. It can be determined whether the ATM identifier confirmation matches the identifier displayed on the ATM. If the ATM identifier confirmation does not match the identifier displayed on the ATM, the user can be prompted to select the image again. If the ATM identifier confirmation matches the identifier displayed on the ATM, a customer authentication and a transaction request can be received from the mobile computing device at step 215.

The customer authentication and/or the transaction request can be verified. For instance, verification can include comparing the received customer authentication and/or the received transaction request against the information stored on and/or accessed by the one or more servers 105. If the received customer authentication and/or the received transaction request do not match the information stored on and/or accessed by the one or more servers 105, the received transaction request can be canceled by the ATM 110 and/or the server 105.

At step 220, responsive to verifying the customer authentication, the transaction request can be processed. "Processed" or "processing" means performing one or more actions, operations, changes and/or functions to effectuate a transaction request. In one or more implementations, the transaction request can be processed by the ATM. For instance, the transaction request can be a cash withdrawal in a specified amount. In such case, the server can instruct and/or authorize the ATM to dispense the specified amount of cash. As a further example, the transaction request can be a funds transfer, a bill payment, or a person to person payment. In one or more implementations, the ATM can instruct and/or authorize the server to process the transaction request.

In one or more arrangements, the result of the transaction can be displayed on the ATM. In one or more arrangements, the result of the transaction can be displayed on the mobile computing device. In one or more arrangements, additional information and/or instructions can be presented to the user on the ATM and/or the mobile computing device. As an example, if the transaction is a cash withdrawal, the ATM and/or the mobile computing device can instruct the user to take the cash dispensed by the ATM. As another example, the ATM and/or the mobile computing device can inform the user of a problem with the transaction and/or whether the transaction is canceled.

FIG. 3 is a flow chart illustrating a method 300 of conducting a financial transaction in accordance with one embodiment disclosed within this specification. A transaction request can be sent to a server. The transaction request can be input by a user (e.g. a person) in any suitable manner on any suitable computing device, such as the mobile computing device 115.

A notification can be received. The notification can include any suitable information concerning the requested transaction. In one or more arrangements, the notification can inform the user of the status of the requested transaction (e.g. the requested transaction is pending). In one or more arrangements, the notification can instruct the user to complete the requested transaction at an ATM 110.

In some arrangements, the notification can include information about one or more ATMs 110 that are near the user's current location or within a user or system specified distance from the user's current location. The notification can present a list of one or more ATMs 110 that are currently enabled or equipped to complete the transaction. For instance, when the requested transaction is a cash withdrawal, a list of one or more ATMs that have sufficient cash available to complete the cash withdrawal can presented.

At step 305, signals from one or more transceivers associated with the ATM can be detected by the mobile computing device. The ATM can be an ATM identified in the notification, or the ATM can be an ATM that was not included in the notification.

At step 310, based on the detected signals from the one or more transceivers associated with the ATM, the location of the ATM relative to the mobile computing device can be determined and/or the distance to the ATM relative to the mobile computing device can be determined. The mobile computing device, such as the transaction module, can be configured to determine the location of and/or the distance to the ATM in any suitable manner. As an example, the location of and/or the distance to the ATM relative to the mobile computing device can be determined by any using any suitable triangulation technique or methodology.

At step 315, location information of the ATM relative to the mobile computing device can be presented on the mobile computing device. The location information can be presented in real-time. The location information can include the current distance to the ATM from the current location of the mobile computing device. The location information can include the relative location of the ATM with respect to the current location of the mobile computing device. The location information can be presented in any suitable manner. One example of the presentation of the location information is shown in and described in connection with FIG. 5 below.

The mobile computing device (e.g. the transaction module) can be configured to determine whether the mobile computing device is located within a predefined distance from the ATM. The mobile computing device (e.g. the ATM module) can be configured to determine whether the ATM is currently being used by another user. For instance, the mobile computing device can query the ATM as to its current usage status. The ATM can respond by indicating that it is currently available for use (e.g. it is not currently being used by another person), that it is not currently available for use (e.g. it is currently being used by another person or it otherwise cannot currently perform transactions), etc. The determination can be made on a continuous, periodic, irregular or even random basis.

At step 320, responsive to a determination that the mobile computing device is located within a predefined distance from the ATM and a determination that the ATM is currently available for use, a user interface can be presented on the mobile computing device for receiving an ATM identifier confirmation. One example of such a user interface is presented and described in connection with FIG. 7 below. If it is determined that the mobile computing device is not located with a predefined distance from the ATM and/or if it is determined that the ATM is not currently available for use, then a user interface for receiving an ATM identifier confirmation is not presented on the mobile computing device. Further, if it was determined that the mobile computing device is located with a predefined distance from the ATM and that the ATM is currently available for use, but if the status of one or both of those determinations subsequently changes, then the presented user interface for receiving an ATM identifier confirmation can be closed or deactivated.

At step 325, responsive to a received ATM identifier confirmation matching an ATM identifier displayed on the ATM, sending a customer authentication (e.g. a PIN) and/or a transaction request to the ATM. If the received ATM identifier confirmation does not match the ATM identifier displayed on the ATM, the user can be prompted to input the ATM identifier confirmation again. Alternatively, the user may be prompted to input a new ATM identifier confirmation. If the ATM identifier confirmation does not match the ATM identifier displayed on the ATM after a predetermined number of attempts, the requested account and/or the requested transaction can be locked or canceled or other action can be taken.

Figure 4:
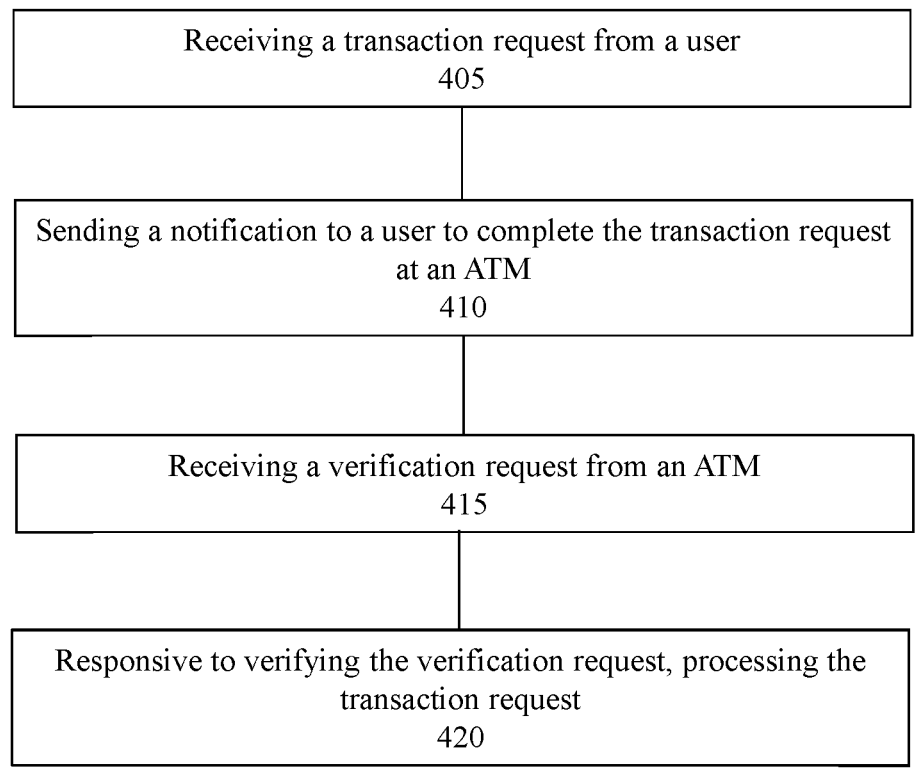
FIG. 4 is a flow chart illustrating a method of automated financial transactions in accordance with one embodiment disclosed within this specification.

FIG. 4 is a flow chart illustrating a method 400 of conducting a financial transaction in accordance with one embodiment disclosed within this specification. At step 405, a transaction request can be received from a user. At step 410, a notification can be sent to a user to complete the transaction request at an ATM. The notification can include any suitable information concerning the requested transaction. In one or more arrangements, the notification can inform the user of the status of the requested transaction (e.g. the requested transaction is pending). In one or more arrangements, the notification can instruct the user to complete the requested transaction at an ATM 110.

In some arrangements, one or more ATMs communicatively linked to the server can be queried or assessed by the server to determine whether the ATM is currently enabled or equipped to complete the transaction. The notification can include information about one or more ATMs 110 that are near the user's current location or within a user or system specified distance from the user's current location. The notification can present a list of one or more ATMs 110 that are currently enabled or equipped to complete the transaction. For instance, when the requested transaction is a cash withdrawal, a list of one or more ATMs that have sufficient cash available to complete the cash withdrawal can be sent to the user.

The transaction request can be stored in a suitable database. For instance, the transaction request can be stored on the server and/or accessed from a database communicatively coupled to the server. The transaction request can be marked with any suitable information. For instance, the transaction request can be marked as pending.

When an ATM receives customer authentication and/or a transaction request from a mobile computing device, the ATM can send a verification request to the server. The verification request can be processed by the server to determine whether the information includes in the verification request matches an existing customer record. For instance, it can be determined whether the customer authentication matches the customer authentication included in the existing customer record. In this respect, "match" or "matches" means that the received customer authentication and the customer authentication included in the existing customer record are identical. In some embodiments, "match" or "matches" can also mean that the received customer authentication and the customer authentication included in the existing customer record are substantially identical. For instance, the received customer authentication and the customer authentication included in the existing customer record can match within a predetermined probability (e.g., at least about 85%, at least about 90%, at least about 95% or greater) or confidence level.

Alternatively or in addition, it can be determined whether the transaction request matches the transaction request including in an existing customer record. At step 415, responsive to verifying the verification request, the transaction request can be processed. If the verification request is not verified (e.g. the customer authentication and/or the transaction request does not match an existing customer record), the server can command the ATM to decline, cancel, suspend or hold the transaction request. In this respect, "match" or "matches" means that the received transaction request and the transaction request included in the existing customer record are identical. In some embodiments, "match" or "matches" can also mean that the received transaction request and the transaction request included in the existing customer record are substantially identical. For instance, the received transaction request and the transaction request included in the existing customer record can match within a predetermined probability (e.g., at least about 85%, at least about 90%, at least about 95% or greater) or confidence level.

At step 420, responsive to verifying the customer authentication, the transaction request can be processed. In one or more implementations, the transaction request can be processed by the server. In one or more implementations, the server can instruct and/or authorize the ATM to process the transaction request. For instance, the transaction request can be a cash withdrawal in a specified amount. In such case, the server can instruct and/or authorize the ATM to dispense the specified amount of cash. In some instances, the transaction request can be a bill payment, a person to person payment and/or a funds transfer. The server can deduct the withdrawn amount from the appropriate account. The server can mark the transaction as being completed.

Figure 5:
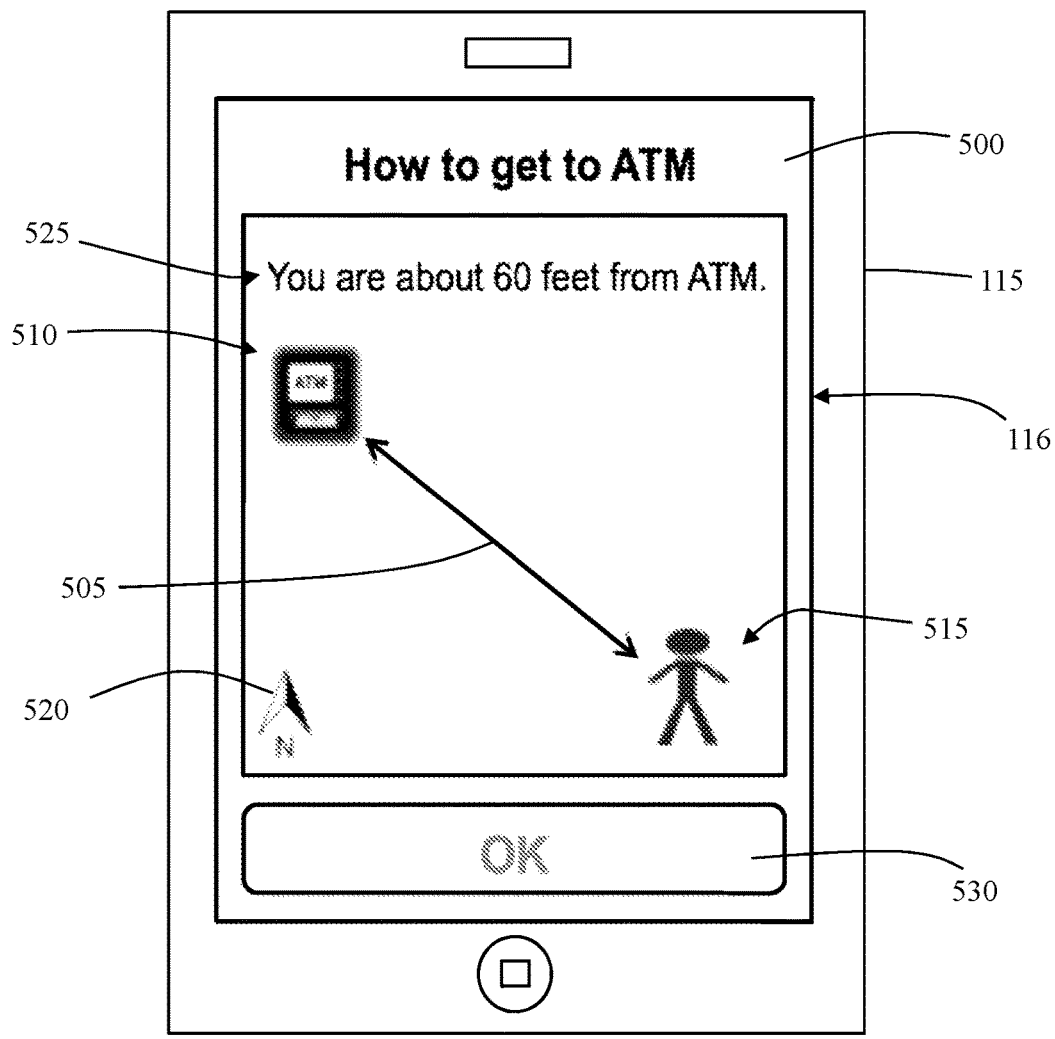
FIG. 5 is a block diagram illustrating various examples of a page displayed on a mobile computing device in accordance with one embodiment disclosed within this specification.

An ATM locator page can be presented to a user of the mobile computing device. One example of an ATM locator page 500 is shown in FIG. 5. The ATM locator page 500 can be presented on a display 116 of the mobile computing device 115 in any suitable manner, including, for example, in an application screen, a web-browser, a main window, a "pop-up" window, a dialog box, or other manner of display. The ATM locator page 500 can present any suitable information to a user to guide a user to an ATM.

The information presented on the ATM locator page 500 can be updated dynamically in real-time as the user moves relative to the ATM. As used herein, the term "real time" means a level of processing responsiveness that a user or system senses as sufficiently immediate for a particular process or determination to be made, or that enables the processor to keep up with some external process.

The ATM locator page 500 can include one or more user interface elements, such as graphical user interface elements (e.g. buttons), to facilitate a user's finding of an ATM. A "user interface element" is defined as a component or a group of components that enables a user to interact with a machine. The term user interface element includes graphical user interface elements. A "graphical user interface element" is defined as an image or a portion of an image that presents information to a user or allows the user to interact with a device through a display.'

In one or more arrangements, the ATM locator page 500 can present a directional graphical user interface element, such as an arrow 505. The arrow 505 can point in the direction of the ATM relative to the current location of the user. In one or more arrangements, the ATM locator page can present a graphical user interface element representing the ATM 510 and/or a graphical user interface element representing the user 515. The arrangement of the graphical user interface element representing the ATM 510 and/or the graphical user interface element representing the user 515 can be updated in real-time as the user moves relative to the ATM. Thus, the positions of the graphical user interface element representing the ATM 510 and/or the graphical user interface element representing the user 515 can change on the ATM locator page 500.

The ATM locator page 500 can also present information to facilitate a user's orientation. For instance, the ATM locator page 500 can present a graphical user interface element that represents one or more compass points. As an example, the graphical user interface element can be a north compass point 520, as shown in FIG. 5.

In one or more arrangements, the ATM locator page 500 can present information in other forms. For instance, information can be presented as text on the ATM locator page 500. For instance, the ATM locator page 500 can present information about the approximate distance between the user and the ATM 525, as determined by the mobile computing device 115 or otherwise. The distance can be presented in any suitable unit of measure.

The ATM locator page 500 can permit a user to hide or close the page. For example, a user may see the ATM and no longer needs the information presented on the ATM locator page 500. To that end, one or more user interface elements can be presented to the user, such as "OK" button 530.

Figure 6:
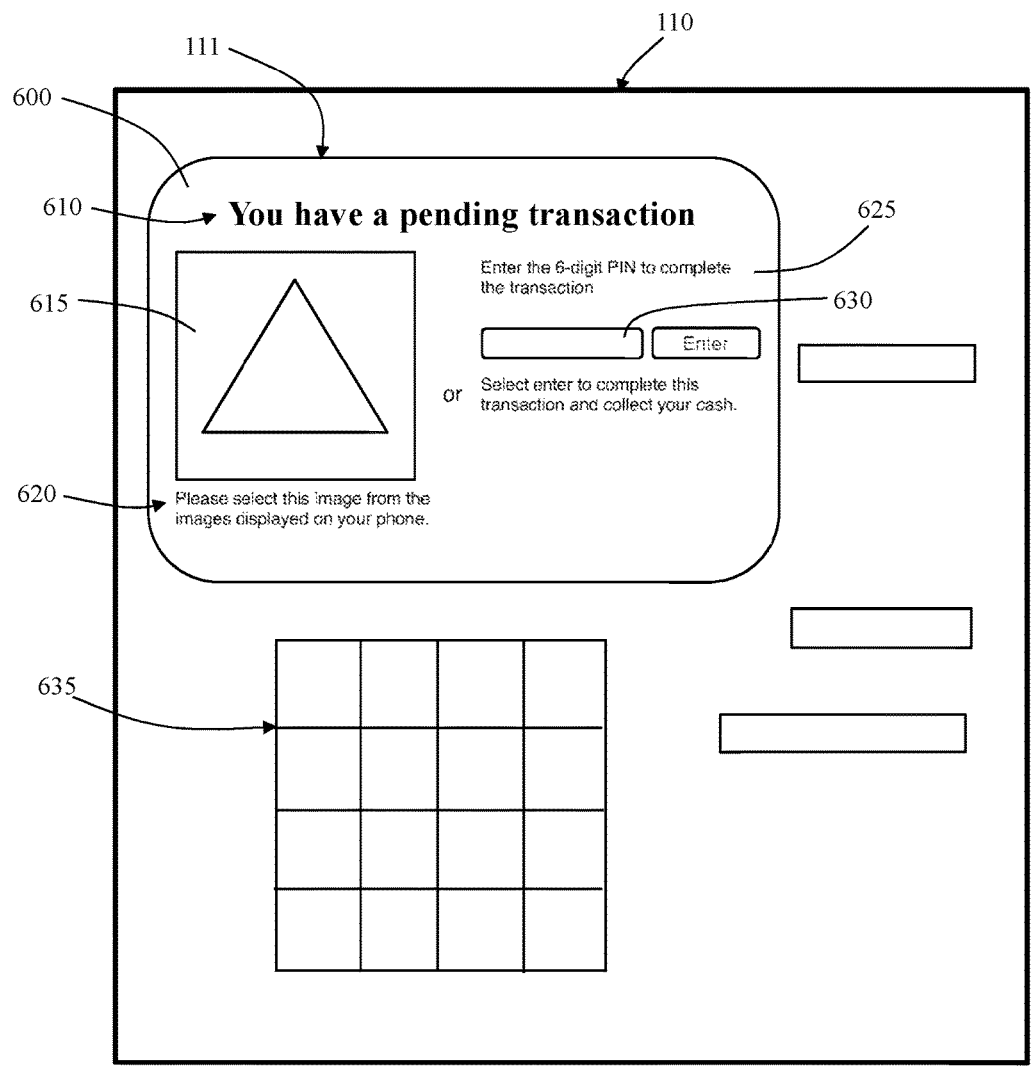
FIG. 6 is a block diagram illustrating various examples of a page displayed on an ATM in accordance with one embodiment disclosed within this specification.

An ATM welcome screen can be presented to a user on a display of the ATM. One example of an ATM welcome screen 600 is shown in FIG. 6. The ATM welcome screen 600 can be displayed in any suitable manner on a display 111 of the ATM 110. The ATM welcome screen 600 can present any suitable information to a user.

For instance, the ATM welcome screen 600 can include a transaction indicator 610. The transaction indicator 610 can be presented in any suitable form. For instance, the transaction indicator 610 can be presented as text indicating whether or not there is a pending transaction.

Further, the ATM welcome screen 600 can present one or more ATM identifiers 615. In one or more arrangements, the ATM identifier 615 can be an image. Any suitable image can be presented. The image can be selected from a plurality of images in a database that can be located on or otherwise accessible by the ATM. The selection of the image can occur randomly or in any suitable manner.

While FIG. 6 shows an example in which the ATM identifier 615 is a geometric shape, it will be understood that the ATM identifier 615 is not limited in this respect. Indeed, the ATM identifier 615 can be, for example, one or more letters, numbers, words, phrases, symbols, characters, pictures, illustrations and/or combinations thereof.

In one or more arrangements, the ATM welcome screen 600 can include a request 625 for user input of a sequence of characters as the ATM identifier. For instance, the ATM identifier can be an alphanumeric sequence. "Alphanumeric sequence" means a plurality of letters and/or numbers. In one or more arrangements, the alphanumeric sequence can be the user's PIN. Alternatively, the alphanumeric sequence can be different from the user's PIN. In some arrangements, the alphanumeric sequence can be generated randomly or in any other suitable manner by the ATM or one or more system components. The generated alphanumeric sequence can be presented on the display 111 of the ATM 110.

The ATM welcome screen 600 can present instructions 620 with respect to the displayed ATM identifier image 615. For instance, the ATM welcome screen 600 can instruct a user to select the displayed image from a plurality of images displayed on the user's mobile computing device 115. The ATM welcome screen 600 can present instructions 625 with respect to the user's PIN or an alphanumeric sequence. As an example, the ATM welcome screen 600 can instruct a user to input the PIN or alphanumeric sequence on the mobile computing device. As another example, the ATM welcome screen 600 can provide an input field 630 to receive a user input using a suitable user interface element of the ATM (e.g. keypad 635).

Figure 7:
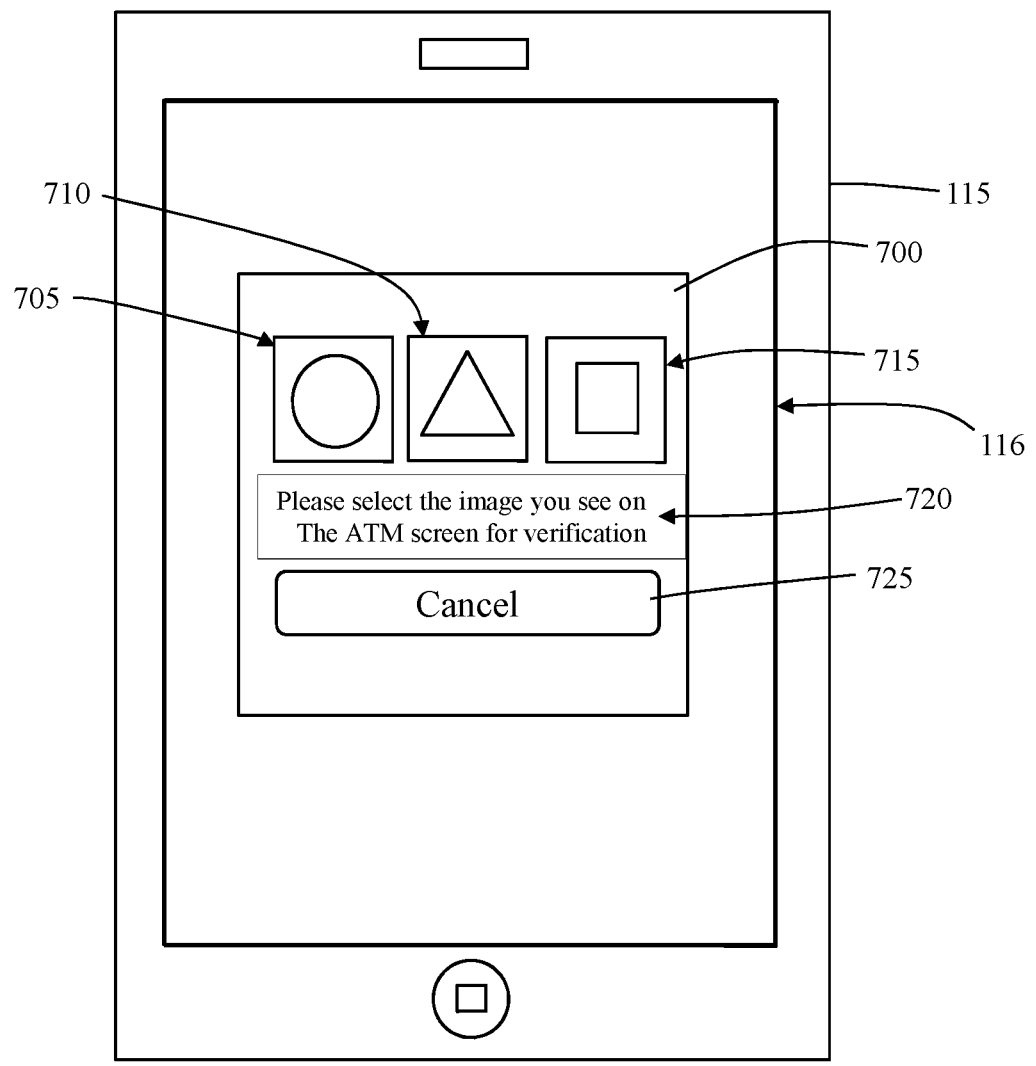
FIG. 7 is a block diagram illustrating various examples of a page displayed on a mobile computing device in accordance with one embodiment disclosed within this specification.

An ATM identifier input page can be presented to a user on the mobile computing device. One example of an ATM identifier input page 700 is shown in FIG. 7. The ATM identifier input page 700 can be displayed in any suitable manner on the mobile computing device, including, for example, in an application screen, a web-browser, a main window, a "pop-up" window, a dialog box, or other manner of display. The ATM identifier input page 700 can present any suitable information to facilitate a user's input of a suitable ATM identifier.

As an example, when the ATM identifier is an image, a plurality of images 705, 710, 715 can be presented on the ATM identifier input page. One of the plurality of images can be identical to the ATM identifier presented on the ATM welcome screen (e.g. image 710 in FIG. 7 is identical to the ATM identifier 615 in FIG. 6). Any suitable quantity of images can be presented. While FIG. 7 shows three images as being presented, it will be understood that arrangements are not limited to three images. Indeed, for example, more than three images can be presented to the user on the ATM identifier input page 700.

The ATM identifier input page 700 can present instructions 720 with respect to the displayed plurality of ATM identifiers 705, 710, 715. For instance, the instructions 720 can instruct a user to select one of the images presented on the mobile computing device that matches the image presented on the ATM screen.

In one embodiment, the display of the mobile computing device can be a touch screen display or a multi-touch display. The touch screen can allow a user to engage or interact with one or more displayed elements, such as a graphical user interface (GUI), and/or other applications running on the mobile computing device through, for example, contact with the display. For example, a user may make selections by simply touching the display via a finger or stylus, which may be interpreted by the device to perform an action based on the touch event.

The ATM identifier input page 700 can permit a user to hide the page, close the page and/or otherwise cancel the transaction. To that end, one or more user interface elements can be presented to the user, such as a "Cancel" button 725.

Arrangements described herein can permit a user to conduct financial transactions in a convenient and secure manner. Arrangements described herein can permit a user to conduct financial transactions without direct interaction with an ATM, except for removing any cash dispensed from the ATM. Also, arrangements herein can allow a user to complete financial transactions on a mobile computing device without requiring an Internet-based communications networks (e.g. Wi-Fi) are not available. Indeed, Internet-based communication networks are not readily available, are not strong or are otherwise not reliable in certain ATM locations (e.g. a lower level of an indoor shopping mall).

Arrangements described herein can ensure that a user is sufficiently close to an ATM before processing a transaction. Arrangements described herein can also provide an additional security measure to ensure that that user and/or ATM is uniquely identified before dispensing cash. Arrangements described herein can also facilitate precisely locating an ATM and/or guiding a user to the ATM without relying on a Global Positioning System or other geo-location systems (e.g. Wi-Fi), which may be weak, unavailable, unreliable and/or insufficiently accurate for micro-location detection in certain ATM locations.

Further, arrangements described herein can enable a user to conduct financial transactions without being dependent on lighting conditions, camera quality and favorable weather in outdoor locations. Further, arrangements described herein can avoid the need for scanning barcodes or QR codes using a camera.

Financial entities (e.g. banks) can use the ATMs and non-ATM devices as synching points. At such locations, users who do not have mobile Internet access can complete their offline transactions as a means of synching their offline transactions with a server of the financial entity.

Figure 8:
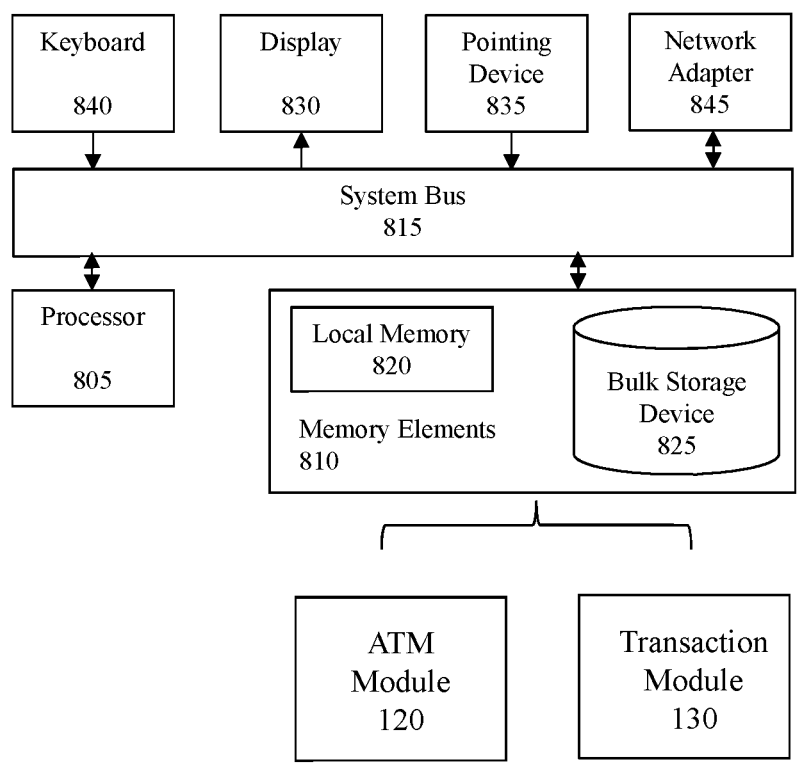
FIG. 8 is a block diagram illustrating a system for determining for automated financial transactions in accordance with one embodiment disclosed within this specification.

FIG. 8 is a block diagram illustrating an example of a data processing system 800. The data processing system 800 can be a part of the server 105, the ATM 110 and/or the mobile computing device 115. System 800 can include at least one processor (e.g., a central processing unit) 805 coupled to memory elements 810 through a system bus 815 or other suitable circuitry. As such, system 800 can store program code within memory elements 810. Processor 805 executes the program code accessed from memory elements 810 via system bus 815 or the other suitable circuitry.

In one aspect, system 800 is implemented as a computer or other programmable data processing apparatus that is suitable for storing and/or executing program code. It should be appreciated, however, that system 800 can be implemented in the form of any system including a processor and memory that is capable of performing and/or initiating the functions and/or operations described within this disclosure. Further, system 800 can be implemented in any of a variety of different form factors including, but not limited to, a portable device such as a mobile communication device, a tablet computing and/or communication device, a laptop computing device, a desktop computing device, a server, or the like.

Memory elements 810 include one or more physical memory devices such as, for example, local memory 820 and one or more bulk storage devices 825. Local memory 820 refers to RAM or other non-persistent memory device(s) generally used during actual execution of the program code. Bulk storage device(s) 825 can be implemented as a hard disk drive (HDD), solid state drive (SSD), or other persistent data storage device. System 800 also can include one or more cache memories (not shown) that provide temporary storage of at least some program code in order to reduce the number of times program code must be retrieved from bulk storage device 825 during execution.

Input/output (I/O) devices such as a keyboard 840, a display 830, and a pointing device 835 optionally can be coupled to system 800. The I/O devices can be coupled to system 800 either directly or through intervening I/O controllers. One or more network adapters 845 also can be coupled to system 800 to enable system 800 to become coupled to other systems, computer systems, remote printers, and/or remote storage devices through intervening private or public networks. Modems, cable modems, wireless transceivers, and Ethernet cards are examples of different types of network adapters 845 that can be used with system 800.

As pictured in FIG. 8, memory elements 810 can store the ATM module 120 in the case of the ATM 110. Alternatively, memory elements 810 can store the transaction module 130 in the case of the mobile computing device 115. The ATM module 120 or the transaction module 130, being implemented in the form of executable program code, is executed by system 800 and, as such, is considered an integrated part of system 800. Moreover, the ATM module 120 or the transaction module 130, including any inputs received or outputs generated thereby, are functional data structures that impart functionality when employed as part of system 800.

The transaction request(s), the customer authentication, and/or the ATM identifier confirmation can be output to, and stored within, memory elements 810. As used herein, "outputting" and/or "output" can mean storing in memory elements 810, for example, writing to a file stored in memory elements 810, writing to display 835 or other peripheral output device, playing audible notifications, sending or transmitting to another system, exporting, or the like.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The term "computer readable storage medium" means a storage medium that contains or stores program code for use by or in connection with an instruction execution system, apparatus, or device. As defined herein, a "computer readable storage medium" is not a transitory, propagating signal per se. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of conducting, by a mobile computing device, a financial transaction on an automated teller machine (ATM), comprising:
   receiving, by the mobile computing device and from a display of the ATM, an ATM identifier;
   transmitting, by the mobile computing device and to the ATM, an ATM identifier confirmation; and
   transmitting, by the mobile computing device and responsive to a determination that the ATM identifier confirmation matches the identifier presented on the display of the ATM, a customer authentication or a transaction request, wherein
   the ATM processes the transaction request responsive to verifying the customer authentication or the transaction request.

2. The computer-implemented method of claim 1, wherein
   the ATM identifier is an image, and
   the mobile computing device presents a plurality of images on a display of the mobile computing device, and
   one of the plurality of images is substantially identical to the image on the display of the ATM.

3. The computer-implemented method of claim 1, wherein
   the identifier is an alphanumeric sequence.

4. The computer-implemented method of claim 1, wherein
   the transaction request is a withdrawal of a specified amount of cash from an account, and
   the processing the transaction request includes dispensing the specified amount of cash from the ATM.

5. The computer-implemented method of claim 1, wherein
   the mobile computing device provides an indication that the mobile computer device is located within a predetermined distance from the ATM, and
   the ATM identifier is presented on the display of the ATM responsive to receiving the indication.

6. The computer-implemented method of claim 5, wherein the ATM identified is presented on the display of the ATM responsive to a determination that the ATM is available for use.

7. The computer-implemented method of claim 1, wherein
the ATM identifier confirmation is sent from the mobile computing device over a Bluetooth low energy communication network.

8. A mobile device configured to a financial transaction on an automated teller machine (ATM), comprising:
a hardware processor configured to initiate the following executable operations:
receiving, by the mobile computing device and from a display of the ATM, an ATM identifier;
transmitting, by the mobile computing device and to the ATM, an ATM identifier confirmation; and
transmitting, by the mobile computing device and responsive to a determination that the ATM identifier confirmation matches the identifier presented on the display of the ATM, a customer authentication or a transaction request, wherein
the ATM processes the transaction request responsive to verifying the customer authentication or the transaction request.

9. The mobile device of claim 8, wherein
the ATM identifier is an image, and
the mobile computing device presents a plurality of images on a display of the mobile computing device, and
one of the plurality of images is substantially identical to the image on the display of the ATM.

10. The mobile device of claim 8, wherein
the identifier is an alphanumeric sequence.

11. The mobile device of claim 8, wherein
the transaction request is a withdrawal of a specified amount of cash from an account, and
the processing the transaction request includes dispensing the specified amount of cash from the ATM.

12. The mobile device of claim 8, wherein
the mobile computing device provides an indication that the mobile computer device is located within a predetermined distance from the ATM, and
the ATM identifier is presented on the display of the ATM responsive to receiving the indication.

13. The mobile device of claim 12, wherein
the ATM identified is presented on the display of the ATM responsive to a determination that the ATM is available for use.

14. The mobile device of claim 8, wherein
the ATM identifier confirmation is sent from the mobile computing device over a Bluetooth low energy communication network.

15. A computer program product, comprising:
a hardware storage device having stored therein program code for conducting, by a mobile computing device, a financial transaction on an automated teller machine (ATM),
the program instructions, which when executed by the mobile computing device, cause the mobile computing device to perform:
receiving, by the mobile computing device and from a display of the ATM, an ATM identifier;
transmitting, by the mobile computing device and to the ATM, an ATM identifier confirmation; and
transmitting, by the mobile computing device and responsive to a determination that the ATM identifier confirmation matches the identifier presented on the display of
the ATM, a customer authentication or a transaction request, wherein
the ATM processes the transaction request responsive to verifying the customer authentication or the transaction request.

16. The computer program product of claim 15, wherein
the ATM identifier is an image, and
the mobile computing device presents a plurality of images on a display of the mobile computing device, and
one of the plurality of images is substantially identical to the image on the display of the ATM.

17. The computer program product of claim 15, wherein
the identifier is an alphanumeric sequence.

18. The computer program product of claim 15, wherein
the transaction request is a withdrawal of a specified amount of cash from an account, and
the processing the transaction request includes dispensing the specified amount of cash from the ATM.

19. The computer program product of claim 15, wherein
the mobile computing device provides an indication that the mobile computer device is located within a predetermined distance from the ATM, and
the ATM identifier is presented on the display of the ATM responsive to receiving the indication.

20. The computer program product of claim 19, wherein
the ATM identified is presented on the display of the ATM responsive to a determination that the ATM is available for use.

\* \* \* \* \*